United States Patent [19]

Chang

[11] Patent Number: 4,516,402
[45] Date of Patent: May 14, 1985

[54] LIMITLESS AND LIMITED HEAT SOURCES POWER PLANTS

[76] Inventor: Yan P. Chang, 181 Sherbrooke Ave., Williamsville, N.Y. 14221

[21] Appl. No.: 499,286

[22] Filed: May 31, 1983

Related U.S. Application Data

[63] Continuation-in-part of Ser. No. 406,321, Aug. 9, 1982, abandoned.

[51] Int. Cl.³ .............................................. F01K 13/02
[52] U.S. Cl. ....................................... 60/656; 60/648; 60/676
[58] Field of Search ...................... 60/641.1, 648, 651, 60/671, 676, 646, 656; 203/DIG. 20; 165/109 T

[56] References Cited

U.S. PATENT DOCUMENTS

| | | | |
|---|---|---|---|
| 2,977,095 | 3/1961 | Kemmetmuller | 165/109 T |
| 3,404,537 | 10/1968 | Leonard, Jr. | 203/DIG. 20 |
| 4,023,366 | 5/1977 | Schneider | 60/671 |
| 4,292,809 | 10/1981 | Bjorklund | 60/651 X |
| 4,347,702 | 9/1982 | Tawse | 60/676 X |

Primary Examiner—Stephen F. Husar
Attorney, Agent, or Firm—Christel, Bean & Linihan

[57] ABSTRACT

A method to draw the thermal energy from essentially limitless heat sources, such as the ocean or the atmosphere and limited heat sources such as the combustion of fossil fuels, is provided for the production of mechanical work. The fluid from the heat sources gives heat to the working medium of the prime mover of the power plant through a first heat exchanger. The effluent cooled fluid from the first heat exchanger is used for removing the exhaust heat from the prime mover through a second heat exchanger either directly or indirectly through a heat pump and can also be used for the conversion of saline water into fresh water.

8 Claims, 14 Drawing Figures

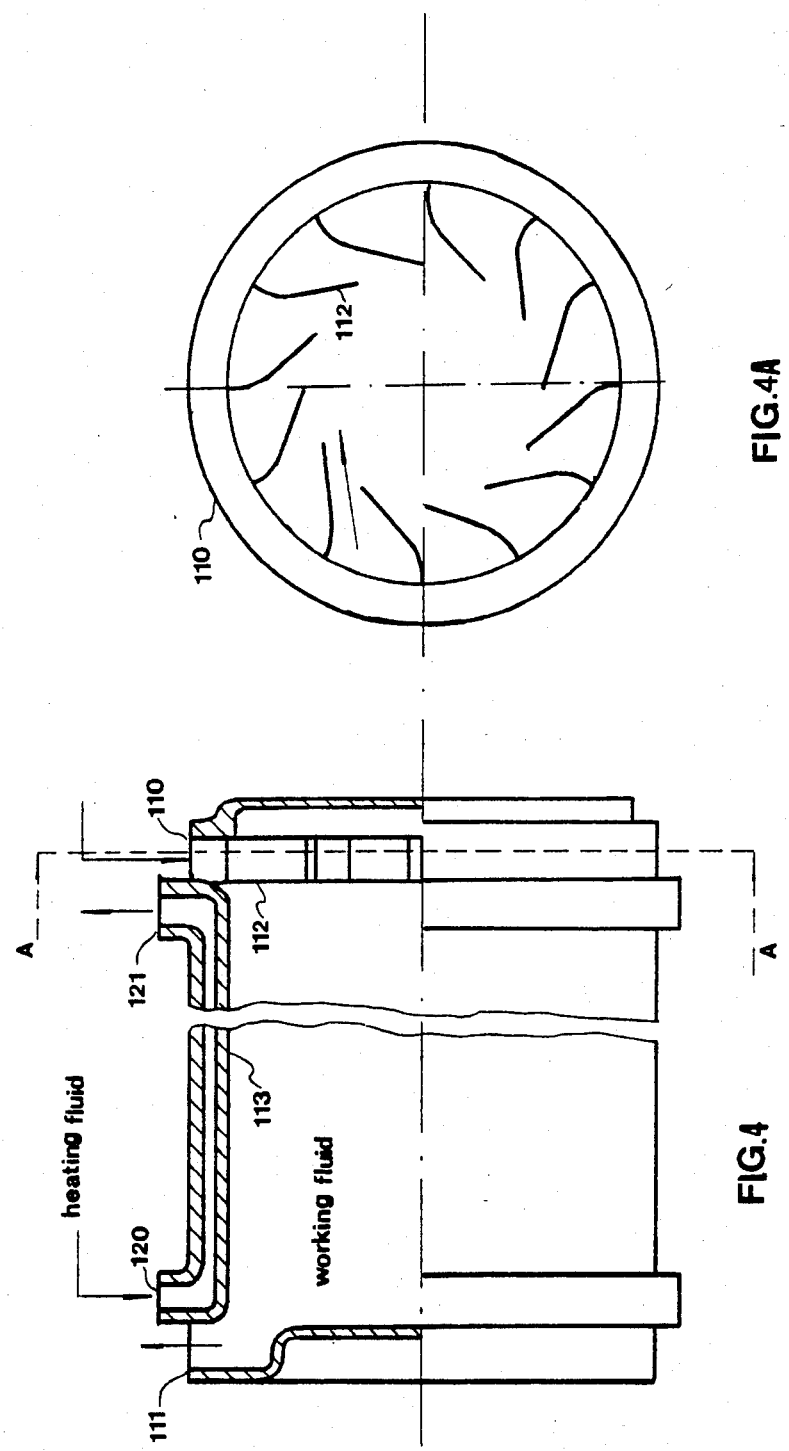

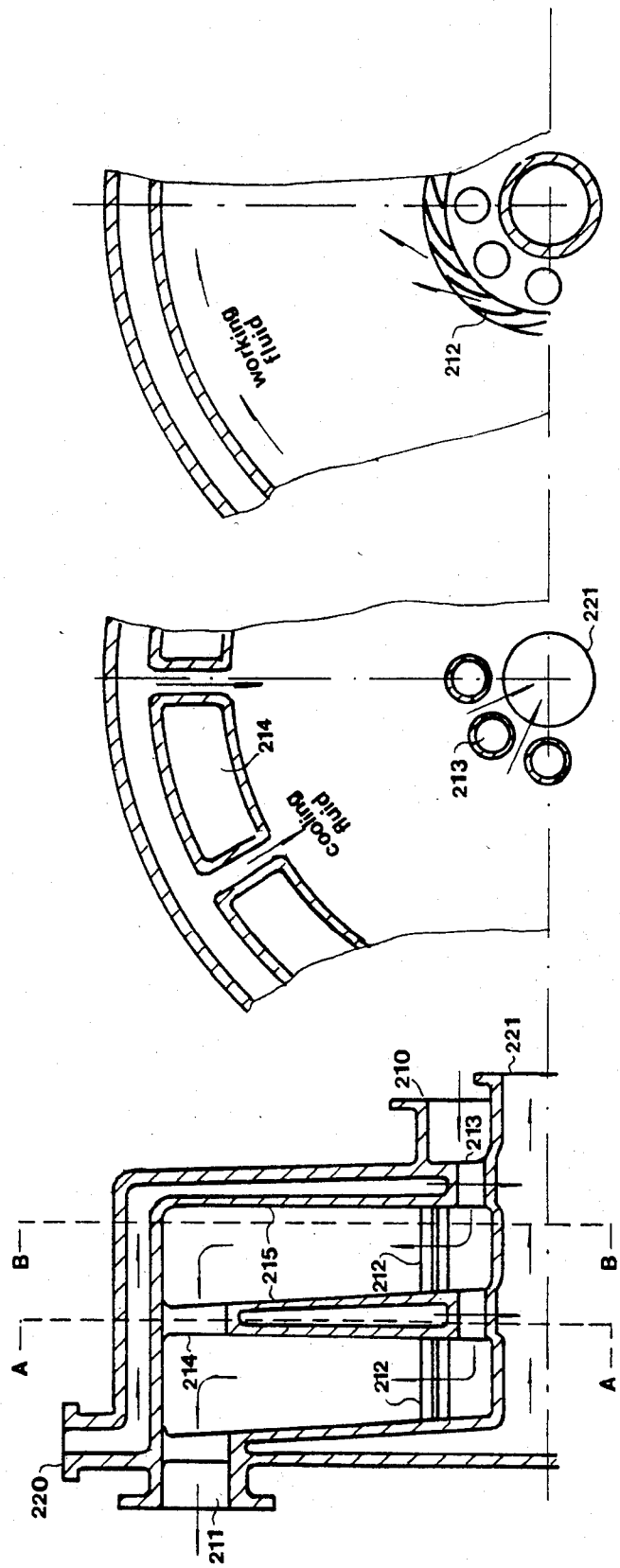

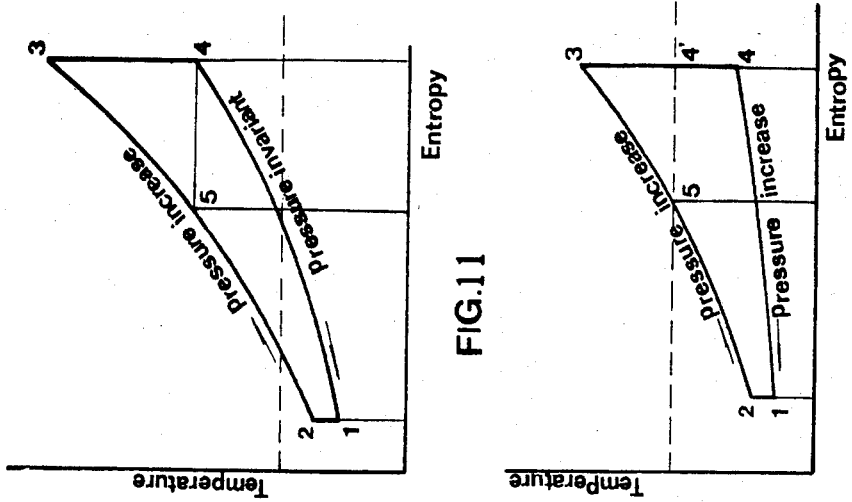
FIG.11
FIG.10
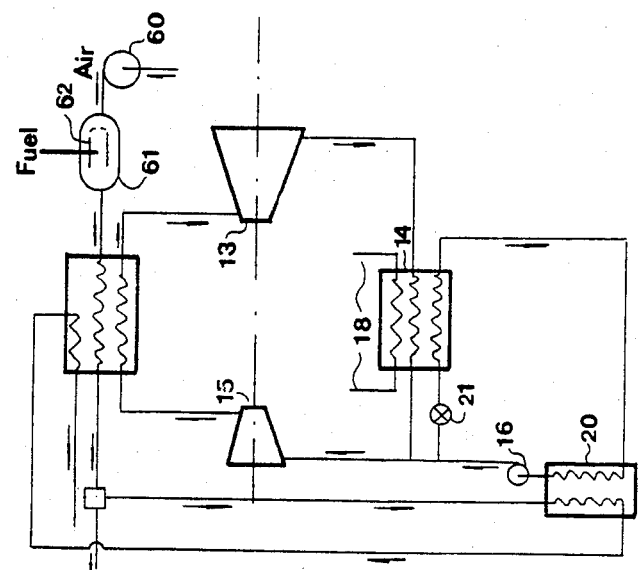
FIG.9
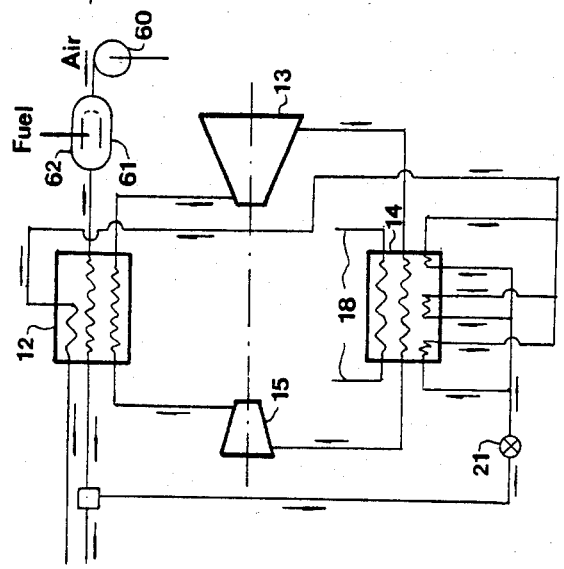
FIG.8

LIMITLESS AND LIMITED HEAT SOURCES POWER PLANTS

BACKGROUND OF THE INVENTION

This invention, which is a continuation-in-part of copending application Ser. No. 406,321 filed Aug. 9, 1982 now abandoned, relates to power plants and, more particularly, to methods for the production of power together with the production of fresh water without significant additional cost, by utilizing the thermal energy from an almost limitless heat sources, such as the atmosphere or the ocean and a limited heat source, such as the fossil fuel, nuclear fuel, geothermal energy, or concentrated solar radiant energy.

In regard to the utilization of limited heat source, the most modern steam turbine power plants lose more than half of the heat input to the environment through the condenser. Various methods have been employed for increasing the overall thermal efficiency, but to date none has been successfully to reduce the cost of energy significantly.

As to the utilization of the limitless heat sources, the earliest attempt to tap the thermal energy of the ocean was made during 1925 to 1929 by G. Claude. Since then, various modifications of the Claude power plant have been proposed, for example, U.S. Pat. No. 3,928,145. Due to the low efficiency of about 2% and the requirements for a large prime mover and associated large piping system, the Claude power plant and those based thereon have never become practical.

Attempts have been made for more than a century to construct an engine drawing heat continuously from the ocean for the power production, but all failed because the ocean had been treated as a closed heat reservoir. A closed heat reservoir is one where only heat can cross its boundary and which is in thermodynamic equilibrium everywhere in the reservoir. A successful method has been disclosed in a copending application of this inventor, Ser. No. 406,321 entitled "Limitless Heat Source Power Plants" and filed Aug. 9, 1982. The success is attributed to the concept of an open heat reservoir which is defined as one where mass and heat can cross its boundary, so that the thermal energy can be carried by the mass flow from one location to another location without relying upon temperature potential.

In regard to the conversion of saline water into fresh water, there are two commonly used methods: evaporation and freezing. Great interest in the latter has recently been revived due to its low energy consumption rate and much decreased requirement for metallic heat transfer surface as compared with the former. The fresh water thus produced is still more expensive in comparison with that obtained from distant natural sources.

It is known that the larger the difference between the highest and the lowest temperatures of a power cycle, the higher will be its thermal efficiency. The high temperature development has been to the allowable limit of material. The lowest temperature has been limited by the naturally available environmental temperature of water and atmosphere.

The basic principle of this invention is similar to that disclosed in a copending application of this inventor as indicated above wherein the limitless heat source is treated as an open heat reservoir. A number of new features are provided, particularly in connection with the supplementary usage of limited heat sources.

BRIEF DESCRIPTION OF THE DRAWINGS

For a fuller understanding of the present invention, reference should be made to the following detailed description thereof taken in conjunction with the accompanying drawings, wherein:

FIG. 4 shows schematically a vortex flow heat exchanger for heating the working fluid;

FIG. 4A is a section taken on line A—A of FIG. 4;

FIG. 5 illustrates a vortex flow heat exchanger for cooling the working fluid;

FIG. 5A is a section taken on line A—A of FIG. 5;

FIG. 5B is a section taken on line B—B of FIG. 5;

FIG. 8 is a flow diagram, in schematic form, of a power plant similar to FIG. 3, without the use of an intermediate volatile fluid between the heat source and the prime mover, with the heat removal from the prime mover by the cooled air-gas mixture and with the removed heat partly recovered;

FIG. 9 is a power plant, similar to FIG. 8, wherein the exhaust heat of the prime mover is removed by the cooled air-gas mixture through a volatile fluid and the removed heat is partly recovered;

FIG. 10 depicts schematically the power cycle for the power plants in FIGS. 8 and 9 with compression heating and cooling and the temperature at the end of expansion below the atmosphere temperature; and FIG. 11 is the power cycle of the power plants in FIGS. 8 and 9 with compression heating, constant pressure cooling and the temperature at the end of expansion above the atmosphere temperature.

SUMMARY OF THE INVENTION

In accordance with this invention, the prime mover may be a turbine operating in a closed cycle. The working medium may be a permanent gas under high pressure or a condensible gas under moderate pressure. The fluids of the limited and limitless heat sources will be referred to as the source fluid. The thermal energy is drawn from an almost limitless heat source and a limited heat source. More specifically, in the following description, the atmosphere or the ocean will be referred to as the limitless heat source, with the combustion of a fossil fuel as the limited heat source.

The source fluid gives heat to the working medium through an intermediary volatile fluid in a large heat exchanger. This intermediate volatile fluid evaporates in the said large heat exchanger and is condensed in a second heat exchanger giving heat to the working medium which derives the prime mover. The limited heat source gives heat to the working medium through a small heat exchanger. The cold effluent source fluid from the large heat exchanger is used for removing the heat rejected from the prime mover through a heat pump or other means. Since the source fluid has been cooled to a temperature below the freezing point of pure water, it can be used for the conversion of saline water into fresh water by a freezing process.

When the thermal energy of the limited heat source is of a significant amount in comparison with that of the limitless heat source, the intermediate volatile fluid and the said large heat exchanger may be omitted and the working medium can be heated by the source fluid in the said second heat exchanger, if the source fluid is clean and noncorrosive, such as the atmospheric air. The source fluid can be cooled to a very low temperature at the exit of the said second heat exchanger. This cooled source fluid, after passing an expansion valve, may be used to remove the exhaust heat from the prime mover. A large part of the removed heat can be recovered by recirculating the source (which has been changed into a sink) fluid to the said second heat exchanger. As a result of having utilized the thermal energy of the limitless heat source which is free from cost and having recovered a part of the exhaust heat from the prime mover, the net work produced by this power plant can be considerably larger than the heat supplied by the limited heat source, which has to be paid for.

DETAILED DESCRIPTION OF THE PREFERRED EMBODIMENTS

Figure 1:
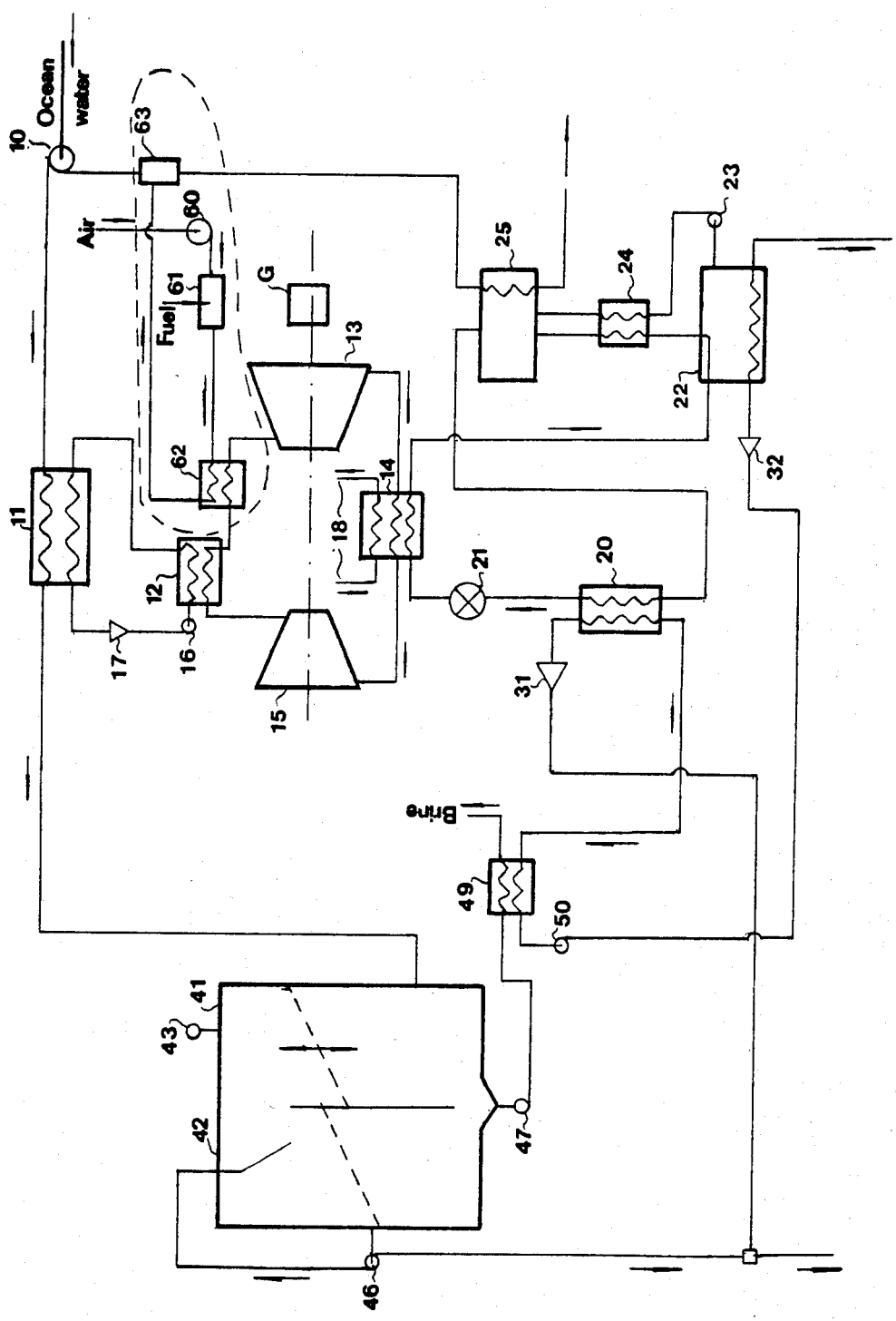
FIG. 1 is a flow diagram, in schematic form, of the power plant equipped with an absorption-refrigeration heat pump and drawing heat from the ocean through an intermediate volatile fluid and from the combustion of a small amount of a fossil fuel.

Referring now in detail to FIG. 1, ocean water is delivered by pump 10 to a large heat exchanger 11 where heat is given out from the saline water to an intermediary volatile fluid. This volatile fluid gives heat through the heat exchanger 12 to the working gas for driving the turbine 13 which drives the generator G. The effluent gas from turbine 13 is cooled in the heat exchanger 14 and compressed by the compressor 15 and the cycle repeats itself. The pump 16 is employed for maintaining the circulation of the intermediary volatile fluid with evaporation in heat exchanger 11 and condensation in heat exchanger 12. The heat exchanger 14 also plays the role of an evaporator of the heat pump as will be seen soon. The throttling by the valve 17 is to obtain the desired low temperature of the source fluid at the exit of the heat exchanger 11.

FIG. 1 also shows, in schematic form, the principal components of an absorption-refrigeration heat pump which includes the condenser 20, the expansion valve 21, the absorber 22, the pump 23, the heat exchanger 24, the generator 25 and the evaporator 14.

The system enclosed by the dotted curve is a supplementary system which draws a small amount of heat supplied by a limited heat source. The atmospheric air is forced to flow into the combustion chamber 61 by the supercharger 60. The hot gas gives heat to the working medium in the heat exchanger 62. The gas effluent from the heat exchanger 62 enters a bubbling chamber 63 where heat is given to the ocean water which in turn heats the generator 25.

The ocean water is cooled to its freezing point just as it leaves the heat exchanger 11, resulting in a solidus and liquidus mixture. This cold mixture goes to the water plant which comprises a solid-liquid separation tank 41 situated as close as possible to the heat exchanger 11 in order to reduce the flow resistance. The pressure in tank 41 is regulated by a valve 43. The ice crystals are transported by a series of pans (not shown) to tank 42 where the ice is washed by its own melt. The cold fresh water is forced to flow by pump 46 into the condenser 20 through a expansion device 31 in order to provide a lower temperature as well as a little partial evaporation of the fresh water in the condenser 20. The warmer fresh water and a trace of its vapor is then cooled by the cold brine in the heat exchanger 49. This cooled fresh water is forced to flow by pump 50 through a expansion device 32 to remove the heat from the absorber 22 by a little partial evaporation. The brine effluent from the heat exchanger 49 will be in general accompanied by a small amount of water vapor. The detailed description of the absorption-refrigeration heat pump as well as the freezing processes of desalination will not be given here, since they are well known to one skilled in the art.

The limited heat source together with an auxiliary system 18 attached to the heat exchanger 14 may be employed for starting the prime mover. The system 18 can be as simple as a tank of liquid air, or dry ice, which can be produced by the power plant during low-load periods (usually at night).

In view of the large quantity of heat to be removed from the heat pump of the absorption-refrigeration type, the liquid coolant of the heat pump will have to discharge into the environment with a small amount of vapor. Since the ocean water which flows through the heat exchanger 11 undergoes no change of phase, the heat exchanger 11 must be very large. It is, in general difficult to have a very large heat exchanger installed in proximity of the prime mover as well as the water plant. Therefore, an intermediate volatile fluid is employed to transmit the heat from the source fluid to the working medium. Other advantages of using the intermediate volatile fluid will be discussed later.

Figure 2:
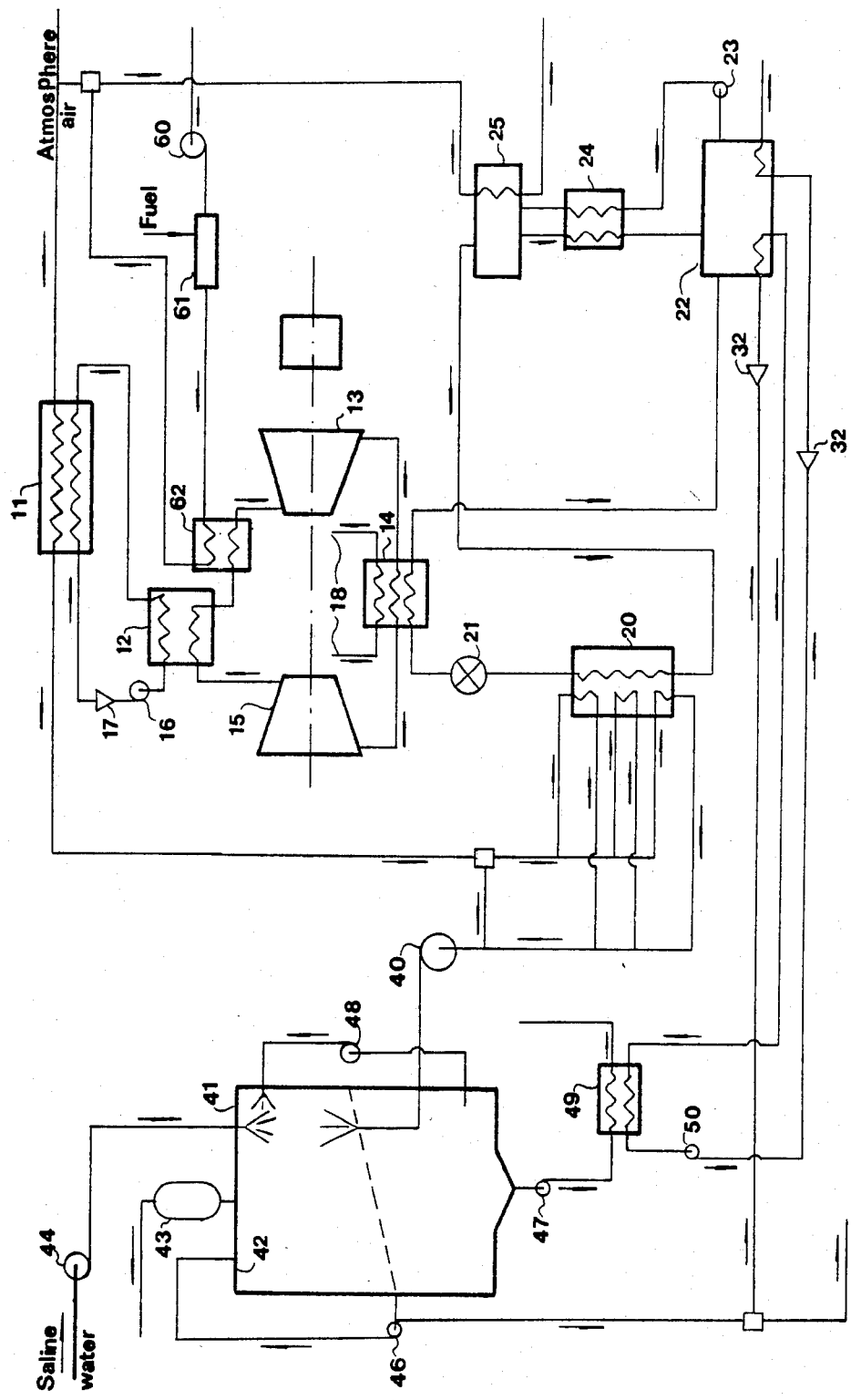
FIG. 2 illustrates a power plant, similar to FIG. 1, wherein the atmosphere is the limitless heat source.

FIG. 2 illustrates the flow diagram, in schematic form, of a power plant which extracts heat from the atmosphere and is equipped with an absorption-refrigeration heat pump. A small amount of heat is supplied to the system by a limited heat source. The same numerals in FIGS. 1 and 2 represent the same components of the power plants, except that the source fluid (air) effluent from the heat exchanger 11 is clean and therefore can be used as the coolant of the condenser 20, while fresh water is used for cooling the absorber 22. The flow passage of the atmosphere air in the heat exchanger 11 must be oriented in vertical position so that air flows downward while the intermediate volatile fluid flows upward by the gravitational force which is quite large due to the large temperature difference involved. In order to have the heat removed from the condenser 20 at almost constant temperature, parallel multiple passages of the cooling air are required between the main conduit and the condenser. After the cold air has extracted the heat from the condenser, its temperature can be still much lower than the freezing temperature of the ocean water. A compressor 40 of compression ratio just enough to produce spray of cold air in the tank 41 is employed for the desalination of the ocean water. The pump 48 recirculates the lighter brine for crystalizing more ice. The regulating valve 43 consists also of a trapping device which permits the discharge of gas but not water. The fresh water discharged from absorber 22 may be accompanied by a little vapor. The limited heat source system can also be used as a starting device of the power plant in conjunction with the auxiliary system 18.

Theoretically, the prime mover of the power plants shown schematically in FIGS. 1 and 2 can operate by a cycle whose lowest temperature can be in the cryogenic levels. In practice, for the power plant in FIG. 1, the lowest temperature should be well above the cryogenic temperature ($-98°$ F.) in order that the heat pump will not be excessively large in comparison with other systems.

Figure 3:
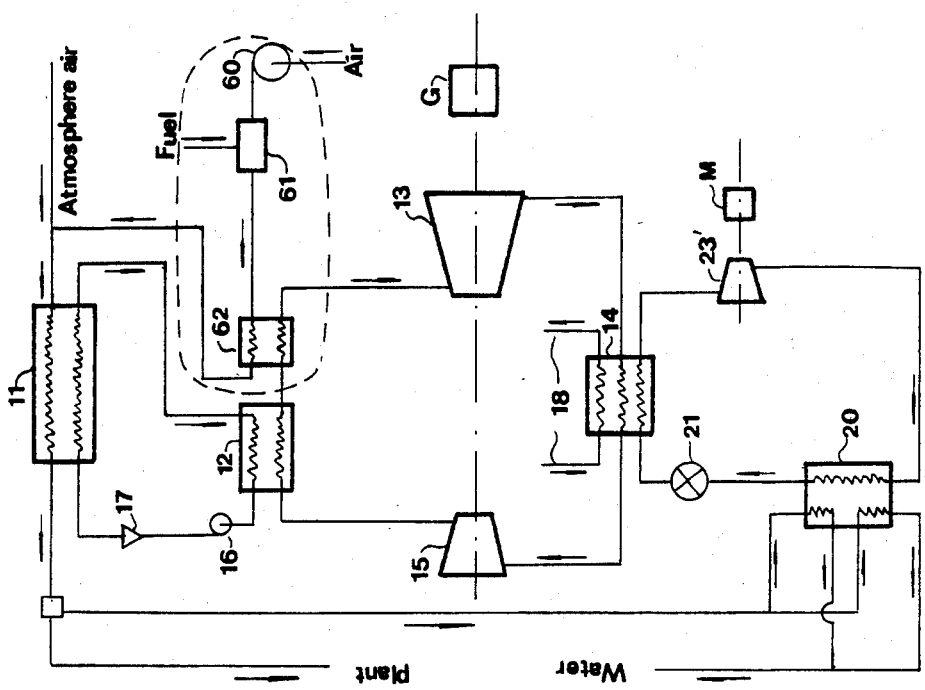
FIG. 3 shows a power plant, similar to FIG. 2, wherein a vapor-refrigeration heat pump is employed.

In FIG. 3 is illustrated the flow diagram, in schematic form, of a power plant which extracts heat from the atmosphere and equipped with a vapor-refrigeration heat pump. A small amount of heat is supplied by the limited heat source as shown by the system enclosed by the dotted curve. The same numerals in this figure and FIGS. 1 and 2 represent the same components, except that the unit 23' in FIG. 3 represents a compressor and the cooling of the condenser 20 is performed by the cooled air. A detailed calculation will show that this power plant will not produce a significant amount of useful work, unless the working medium is heated by a process of increasing pressure. One way to achieve such a process is to use as heat exchanger 12 one of vortex flow type which is disclosed in two copending applications, Ser. No. 399,463, now U.S. Pat. No. 4,433,545, entitled "Thermal Power Plants and Heat Exchangers for Use Therewith" and filed July 19, 1982 and Ser. No. 488,348, now abandoned entitled "Compression Flow Heat Exchangers" and filed Apr. 25, 1983. The basic principle of the vortex-flow heat exchanger is that the working fluid flows inside a cylindrical space in the pattern of helical vortex, as illustrated schematically in FIGS. 4A 4. The working fluid enters the cylindrical space at the inlet 110 through guide vanes 112 and leaves at the outlet 111. The heating fluid enters the inlet 120 of an annular space and leaves at the outlet 121. To reduce the flow friction and to increase the heat transfer, the cylindrical wall 113 may be made of porous material filled with a volatile fluid which has greater affinity with the porous matrix than with the heating and heated fluids. The volatile fluid is boiled by the heating fluid and condensed by the working fluid. A more effective cooling of the working fluid can be achieved by using the vortex cooler shown schematically in FIGS. 5, 5A and 5B. The working fluid enters one or more annular cylindrical chambers through the inlet 210, the conduits 213 and the guide vanes 212, and leaves the outlet 211 through the openings 214. The cooling fluid enters through inlet 220 and leaves by outlet 221. The heat transfer walls 215 may also be made of porous material saturated by a volatile fluid.

Another way to have the pressure of the working fluid increased at heating is to heat it periodically in a number of conduits, or spaces at the constant volume process, somewhat similar to the cycle developed by Lenoir in 1860 and employed in the pulse jet engine during the second world war. However, the vortex flow heat exchangers provide high heat transfer, low flow friction and less entropy increase and therefore are preferred.

Figure 6:
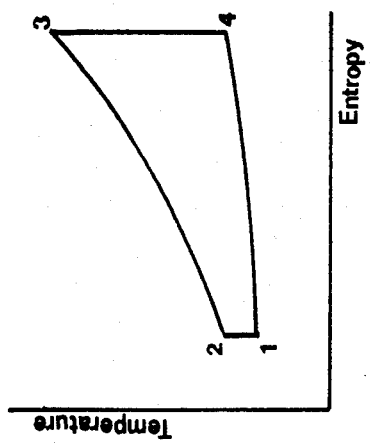
FIG. 6 shows schematically the power cycle of the power plant in FIG. 3 with compression heating and cooling.
Figure 7:
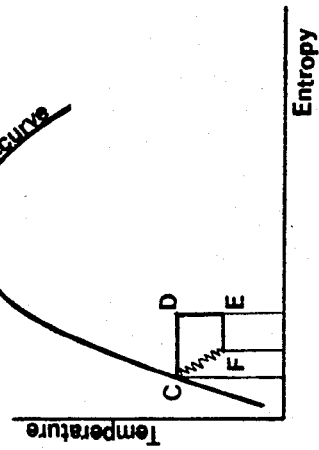
FIG. 7 illustrates schematically the vapor refrigeration cycle per unit mass flow of the working fluid for the power plant in FIG. 3.

FIG. 6 shows schematically the power cycle for the power plant in FIG. 3 where the heating of the working gas is taking place in a process of compression or increasing pressure flow. The heat exchanger 14 may also be of the vortex-flow type, but is not necessary. FIG. 7 illustrates schematically the vapor-refrigeration cycle of the heat pump for unit mass flow of the refrigerant for the power plant in FIG. 3. If M denotes the ratio of mass flow rate of the refrigerant to a unit mass flow rate of the working fluid, then the work required by the heat pump is equal to M times the area CDEF. Comparing the area 1234 in FIG. 6 and M(CDEF) in FIG. 7 shows that useful work can be done by significant amount.

FIG. 8 shows the flow diagram, in schematic form, of a power plant which draws heat from a limited heat source by an amount comparable with that extracted from the atmosphere and the working medium is heated by a compression flow process. The large heat exchanger 11 in FIGS. 1, 2 and 3 is not needed. Air enters the supercharger 60 and an enlarged conduit 61 where the combustion takes place in a small chamber 62. The hot gas gives heat to the working medium in the heat exchanger 12. The effluent gas mixture from the heat exchanger 12 is cooled by the working medium to a temperature which can be as low as in the cryogenic level. This effluent cold gas mixture could be used to remove the heat from the condenser of the vapor refrigeration heat pump in a manner similar to that shown in FIG. 3. However, for the case where the compression ratio of compressor 15 is small, the heat pump may not be needed, if the expansion valve 21 is provided. The residual heat of the gas mixture effluent from the heat exchanger 14 can be recovered for saving fuel by recirculating the gas mixture to the heat exchanger 12, if its temperature is above the atmosphere temperature. Otherwise, it is discharged to the environment or some cooling facilities.

FIG. 9 shows the flow diagram, in schematic form, of a power plant similar to the one in FIG. 8 except that the removal of the exhaust heat from the prime mover is carried out by a volatile fluid which is cooled by the cold gas mixture effluent from the heat exchanger 12. The mixture which has absorbed heat in the heat exchanger 20 is recirculated to the heat exchanger 12 so that a part of the exhaust heat from the prime mover is recovered for saving the fuel. Again, if the compression ratio of the compressor 15 is small, the compressor 23 in FIG. 3 is not needed.

In FIGS. 1 and 2, a permanent gas has been considered as the working medium. If the working medium is a condensable gas, the compressor 15 in those figures is replaced by a pump, or a pump together with a small compressor.

In FIGS. 10–11 are shown the power cycles, for the power plants in FIGS. 8-9, where the heating and cooling are performed in the compression-flow heat exchangers. The state 4 in FIG. 10 is below the atmospheric temperature, while in FIG. 11 the state 4 is above the atmospheric temperature. The dotted lines in both figures designate the atmosphere temperature. The heat supplied from the limited heat source can be measured by the area 34'5 in FIG. 10 and the area 345 in FIG. 11. It is seen that the work done can be considerably larger than the heat input which has to be paid for.

This invention has described systems to draw thermal energy from the ocean, the atmosphere or other sources which are usually considered as passive or inert, such as lakes, rivers and the like which receive solar radiant heat to compensate for the heat that is continuously drawn out by the power plant. Sewage water from a city or industrial waste water can also be utilized for the production of power and conversion into usable water.

The power plants shown in FIGS. 1-3 are suitable for the production of power and fresh water while the power plants shown in FIGS. 8-9 are suitable for ocean going vessels, land moving vehicles and even airplanes. The residual cold gas can be used for space cooling, defogging and even alleviate the atmosphere pollution caused by to an inversion layer. Other applications will be obviously apparent to those skilled in the art.

Although preferred embodiments of the present invention have been illustrated and described, changes will obviously occur to those skilled in the art. It is therefore intended that the present invention is to be limited only by the scope of the appended claims.

What is claimed is:

1. A method of utilizing the thermal energy of a substantially limitless heat source, which is usually considered as an inert heat source such as the atmosphere and the like, and of a limited heat source, such as the combustion of fossil fuel, to power a plant including (i) first heat exchange means operatively associated with the sources, (ii) a prime mover which includes a gas turbine and a compressor, operates in a closed cycle and is operatively associated with the first heat exchange means, (iii) second heat exchange means operatively associated with the prime mover and (iv) an auxiliary system for starting the operation of the prime mover; the said method comprising:

(a) selecting the proper first and second heat exchange means to provide appropriate heating and cooling processes of the power cycle so that the power plant is capable of producing net work with the continuous increase of entropy in the surroundings.
   (b) passing the source fluid from such heat sources through the said first heat exchange means wherein the source fluid gives heat to the working fluid of the turbine and is cooled as it flows out of the first heat exchange means to produce cooled source fluid;
   (c) expanding the heated working fluid in the turbine;
   (d) cooling the expanded working fluid by the said auxiliary system for a short period to start the prime mover and to initiate the continuous release of thermal energy from the limitless heat source;
   (e) cutting off the auxiliary system;
   (f) conducting a portion of the cooled source fluid effluent from the first heat exchange means to the said second heat exchange means wherein the heat of the expanded working fluid is removed and discharged to the cooled source fluid;
   (g) compressing the cooled expanded working fluid back to the said first heat exchange means wherein the compressed working fluid is heated by the source fluid to repeat steps (b), (c), (f) and (g); and
   (h) utilizing the remaining cooled source effluent from such power plant for another cooling process.

2. The method of claim 1 wherein the other cooling process is a freezing process for liquid purification.

3. The method of claim 2 wherein the liquid purification process is desalination of sea water.

4. The method of claim 3 wherein the second heat exchange means includes an absorption-refrigeration heat pump which draws thermal energy largely from the limitless heat source but only a little from the limited heat source, and rejects heat to the cooled source fluid.

5. The method of claim 4 wherein the absorption-refrigeration heat pump is cooled by the cold fresh water produced by desalination.

6. The method of claim 1 wherein: the first heat exchange means comprises a heat exchanger wherein the working fluid is heated at increasing pressure; and the second heat exchange means comprises a vapor-refrigeration heat pump wherein the refrigerant evaporates in the evaporator to cool the working fluid at either increasing pressure or constant pressure.

7. The method of claim 1 wherein: the first heat exchange means comprises a heat exchanger wherein the working fluid is heated at increasing pressure; the second heat exchange means comprises an expansion means and a heat exchanger; a portion of the cooled source fluid being further cooled by passing it through the said expansion means and the further cooled source fluid being used to cool the expanded working fluid in the said heat exchanger of the second heat exchange means at either constant or increasing pressure.

8. The method of claim 1 wherein the first heat exchange means comprises a heat exchanger wherein the working fluid is heated at increasing pressure; and the second heat exchange means comprises a first heat exchanger and a second heat exchanger connected by a closed loop; the said loop containing a volatile fluid and comprising a circulation pump and an expansion means; the said volatile fluid being circulated through the said first heat exchanger to cool the expanded working fluid by evaporation and through the said second heat exchanger wherein the vapor of the volatile fluid undergoes a decelerating flow before it condenses into liquid, releasting heat to the cooled source fluid; the condensate being pumped through the said expansion means to the said first heat exchanger wherein the condensate evaporates.

* * * * *